United States Patent [19]

Dubourg

[11] Patent Number: 4,775,506
[45] Date of Patent: Oct. 4, 1988

[54] NUCLEAR REACTOR HAVING CONTROL CLUSTERS WITH HYDRAULIC ACTUATION

[75] Inventor: Michel F. Dubourg, Le Mesnil St Denis, France

[73] Assignee: Framatome & CIE., Courbevoie, France

[21] Appl. No.: 880,247

[22] Filed: Jun. 30, 1986

[30] Foreign Application Priority Data

Jul. 1, 1985 [FR] France .................. 85 10011

[51] Int. Cl.⁴ .............................................. G21C 7/12
[52] U.S. Cl. ...................................... 376/230; 376/235
[58] Field of Search ............... 376/209, 230, 235, 228; 91/165, 166, 415, 417 R

[56] References Cited

U.S. PATENT DOCUMENTS

| | | | |
|---|---|---|---|
| 2,855,899 | 10/1958 | Beaty | 376/230 |
| 3,248,879 | 5/1966 | Natho | 91/166 |
| 3,321,372 | 5/1967 | Challender | 376/230 |
| 3,573,166 | 3/1971 | Germer | 376/230 |
| 3,728,219 | 4/1973 | Mattern et al. | 376/230 |
| 3,752,736 | 8/1973 | Kornbichles et al. | 376/230 |
| 4,439,054 | 3/1984 | Veronesi | 376/230 |
| 4,544,521 | 10/1985 | Millot et al. | 376/235 |
| 4,714,582 | 12/1987 | Denizou | 376/235 |
| 4,716,008 | 12/1987 | Leroy et al. | 376/230 |

FOREIGN PATENT DOCUMENTS 2260597  6/1973  Fed. Rep. of Germany .

Primary Examiner—Deborah L. Kyle
Assistant Examiner—Richard L. Klein
Attorney, Agent, or Firm—Pollock, Vande Sande & Priddy

[57] ABSTRACT

The reactor comprises a vessel closed by a lid and containing a core formed of fuel assemblies. The reactor comprises control clusters of two different types and an internal structure fixed inside the vessel, placed above the core and comprising means for guiding the clusters. The mechanisms associated with clusters of a first type each comprise a vertical cylinder belonging to the internal structure of the reactor, defining, with a piston from which is suspended a group of rods belonging to a cluster or forming a cluster, a work chamber. That chamber is connected by a duct, passing through the lid, to a valve for optional connection with a space at a pressure lower than that which prevails in the vessel.

7 Claims, 3 Drawing Sheets

NUCLEAR REACTOR HAVING CONTROL CLUSTERS WITH HYDRAULIC ACTUATION

PRIOR ART

The invention relates to nuclear reactors cooled and moderated with light water and in particular pressurized water nuclear reactors. It relates more particularly to nuclear reactors of the type comprising a pressure resistant vessel having a closure lid, a core formed of vertical fuel assemblies placed side by side in the vessel, control clusters provided with mechanisms for moving them vertically between a low position in which they are inserted into the core and a high position where they are outside the core, and an upper internal structure fixed in and to the vessel, placed above the core and comprising means for guiding the clusters. Such a construction is disclosed in European No. 54 788, where the mechanisms include cylinders located above the lid, resulting into high thermal losses and the need for active components outside the vessel.

Some at least of the control clusters are formed of elements containing neutron absorbing material, for driving the reactor and/or providing safety functions. The clusters are generally each controlled by an electromechanical mechanism contained in a sheath placed above the lid and having an extension passing sealingly through this latter. Reactors are also known comprising, in addition to the absorbant element clusters, clusters of elements of another nature, used for example for modifying the energy spectrum of the neutrons in the core. The latter clusters may be more particularly formed of elements containing fertile material. A same assembly may be provided with a cluster of the first type and a cluster of the second type. The clusters of the second type are generally provided for occupying, during operation of the reactor, one or other of their endmost positions. It has been proposed to use the same mechanism for controlling the two clusters (French No. 2,237,764). A drawback of this solution is that there is interference between the movements of the two clusters. It has also been proposed to provide the second type of clusters with an independent hydraulic control using as driving pressure that which prevails inside the vessel. But if coaxial mounting is used it leads to a complex device. If side by side mounting of the two mechanisms is used, it is not possible to obtain perfect symmetry and the number of penetrations through the lid is doubled. None of the known solutions is therefore fully satisfactory, especially when it is desired to provide clusters over a large fraction of the assemblies. The large number of penetrations results furthermore in considerable heat losses.

SUMMARY OF THE INVENTION

It is an object of the invention to provide a nuclear reactor of the above-defined type, using hydraulic control mechanisms for those of the clusters which are to be moved from one of their endmost positions to the other, which makes it possible to use simple duct passages as penetrations. It is an other object of the invention to reduce the heat losses, to simplify the mechanisms and to render construction easier. To this end, there is provided a nuclear reactor of the above-defined type wherein the mechanisms associated with the clusters to be moved between two endmost positions each comprise a vertical cylinder included in the internals of the reactor and defining, with a piston from which is suspended a group of elements belonging to the cluster or forming it, a work chamber connected by a conduit passing through the lid to a valve for optional connection with a space at a pressure lower than that which prevails in the vessel.

With such an arrangement, no active element of the hydraulic control mechanism is located outside the vessel.

Each cluster associated with a fuel assembly may include a plurality of groups, or sub-clusters, angularly distributed apart at regular angular intervals about the axis of the assembly and each provided with a separate cylinder which defines a work chamber and which centers transversal plates for guiding the elements of the group. In the case of a square shaped assembly, clusters will be advantageously used formed of four groups. The work chambers of the four associated cylinders may be connected to the same valve, which causes common actuation of the assembly of the groups, but reduces to one the number of conduits which must pass through the lid for each assembly. A conduit and a valve may also be provided for each cylinder.

Each cylinder and the piston slidably received therein will generally comprise co-operating means for mechanically locking the piston and so the group of elements which it carries, in an upper position. The locking means will generally be of a type which automatically locks at the end of travel. The locking means may be releasable by a separate control, for example an electromagnetic control, or may be calibrated so as to yield under the action of a predetermined force added to the weight of the group of elements and obtained by increasing the pressure in the work chamber.

The invention will be better understood from the following description of a particular embodiment, given by way of example.

SHORT DESCRIPTION OF THE DRAWINGS

DESCRIPTION OF AN EMBODIMENT

Figure 1:
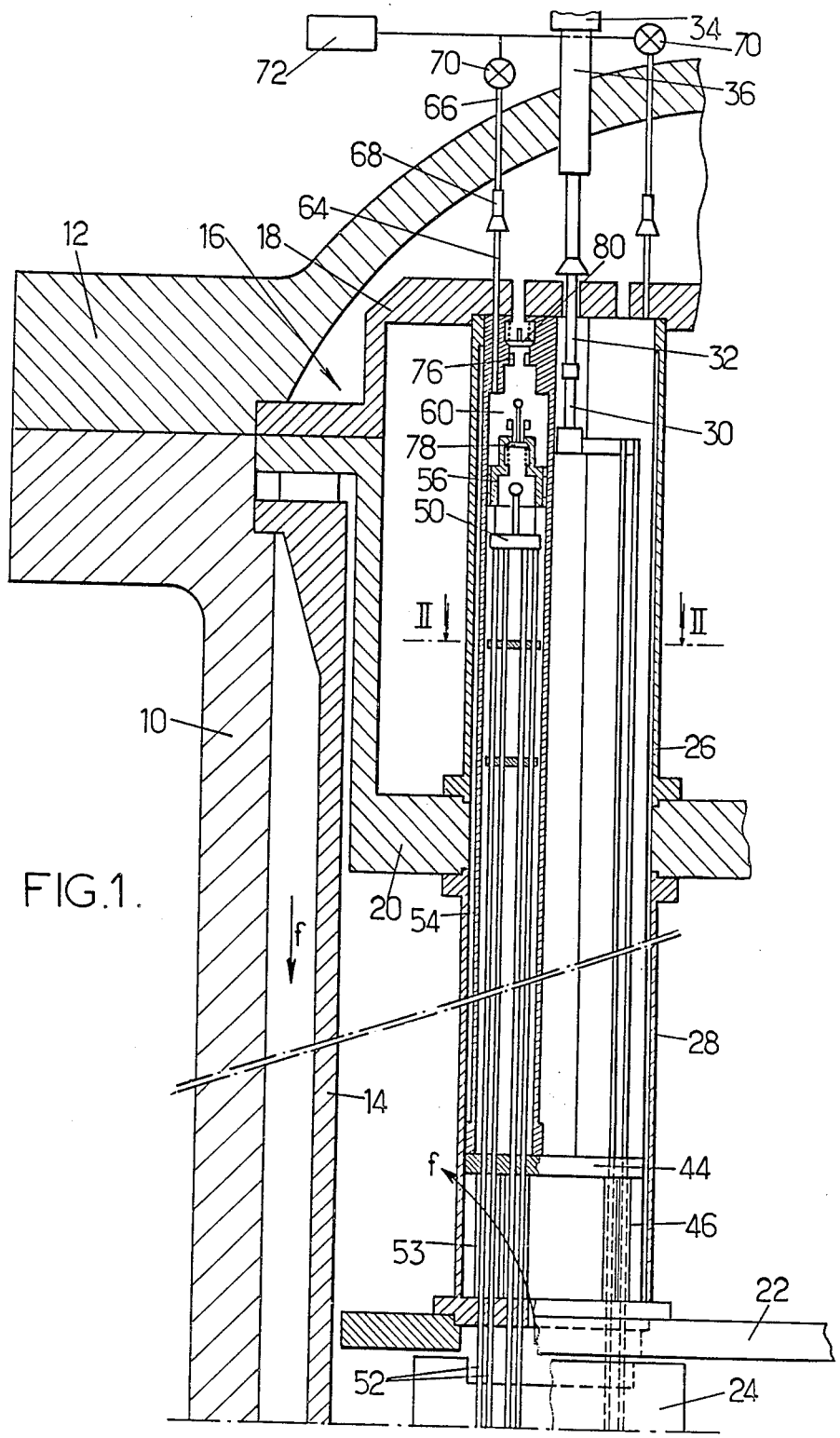
FIG. 1 is a simplified sectional view of part of a nuclear reactor according to one embodiment of the invention having fuel assemblies, some of which at least comprise a control cluster moved electromagnetically and a second cluster controlled hydraulically, the relative arrangement of the two clusters being shown without respecting the scale for more clarity.

Referring to FIG. 1, a nuclear reactor comprises a pressure resistant vessel 10 closed by a lid 12 and having inlet and outlet pipes (not shown) for light water acting as a moderator and a coolant. A barrel or casing 14, also forming a core support, is fixed to the vessel 10. It defines with the vessel a down path for the water from the inlet pipe. The vessel also carries a support structure for the upper internal equipment of the reactor. This structure 16 is formed by two plates 18 and 20 connected together at their periphery and by spacer elements which will later be described constituting a caisson with the two plates.

An upper core plate 22 is located over the reactor core. The core consists of vertical fuel assemblies 24 placed side by side. It will be assumed hereafter that the fuel assemblies have a square cross section and comprise a bundle of fuel elements disposed at the nodes of a square lattice, some of the nodes of the lattice being occupied by guide tubes or even being simply without guide tubes and fuel elements.

As shown in FIG. 1, the assembly 24 is provided with a control cluster of a first type, having an electromechanical pawl mechanism, of well known type, for progressive movement and a hydraulically driven cluster of a second type.

The two clusters move in a guide structure comprising two sleeves 26 and 28. Sleeve 26, placed between plates 18 and 20, forms a spacer which connects them together and increases the rigidity of the support structure 16. Sleeve 28 is suspended from plate 20. It ends in the immediate vicinity of the upper core plate 22 in which it is centered by studs (not shown).

The cluster of the first type will be usually formed of elements containing a material absorbing the neutrons without causing new fissions (such elements being often called "black" or "grey" depending on their degree of absorption). The elements are connected to a pommel 30 which may be secured by any suitable means (not shown) to a drive rod 32 connected to an electromechanical mechanisms 34, situated above lid 12. The rod projects through the lid within a sealing sleeve 36.

Figure 2:
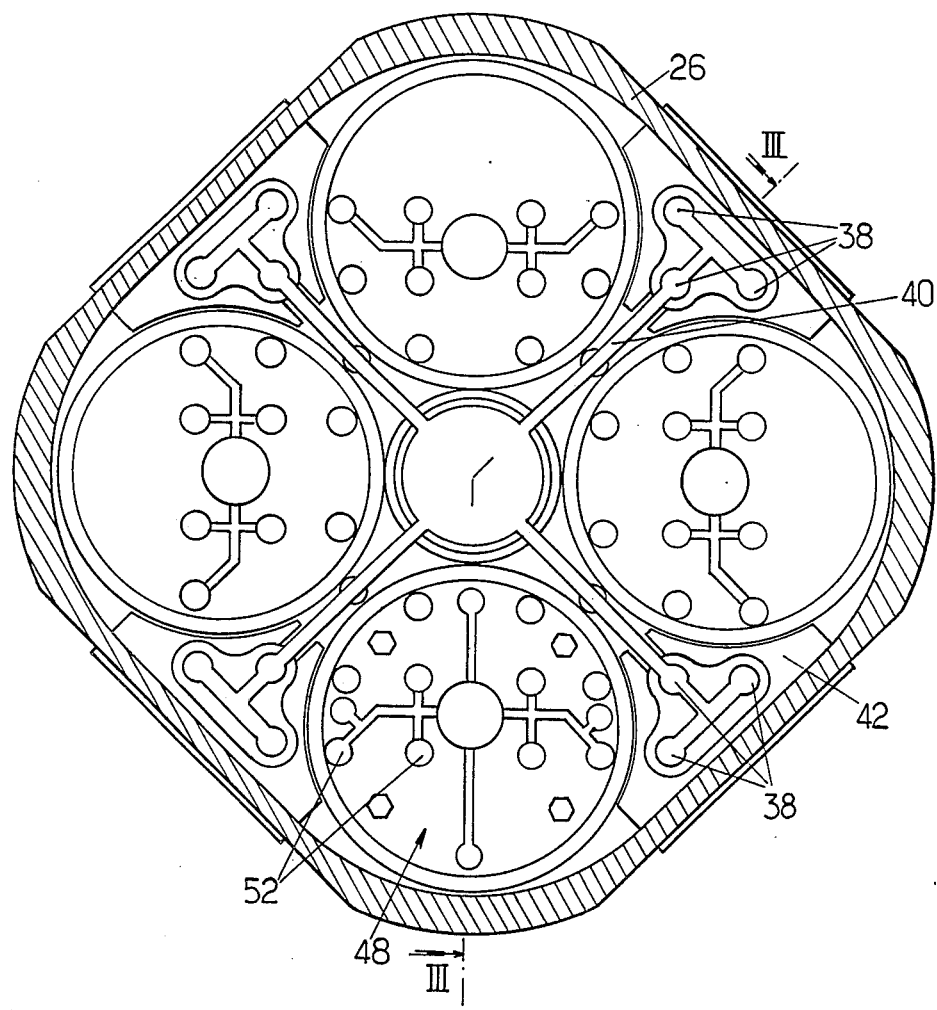
FIG. 2 shows a possible arrangement of the two clusters, in section through II—II in FIG. 1.

The arrangement described up to present is conventional and consequently it is not necessary to describe it in detail. The cluster shown by way of example in FIGS. 2 and 3 comprises twelve elements 38 connected to the pommel 30 by a cross-shaped structure or "spider" 14. The neutron absorbing elements 38 are guided, inside sleeve 26 and the upper part of sleeve 28, by gusset plates 42 spaced apart along the sleeves (FIG. 2). In the lower part of sleeve 28, below a partition 44, the neutron absorbing elements 38 are guided individually by tubes 46 fixed to the partition 44. Below the partition 44, sleeve 28 comprises wide lateral openings allowing the water which leaves the fuel assembly to flow out into the collection space provided above the upper plate of core 22 and often called "outlet plen/um". The water thus flows along the path indicated by arrows f towards the outlet pipe (not shown). A more complete description of such a structure may be found in French No. 2,168,564.

The cluster of the second type includes four identical groups or subclusters, distributed regularly about the axis of sleeve 26. Since all subclusters and driving mechanisms are identical, a single one, 48, will be described. It comprises a pommel 50 to which rods 52 are fixed. The rods may contain fertile material or inert material, with low neutron absorption, for modifying the energy spectrum of the neutrons in the core. They may also be formed from neutron absorbing material different from that of the cluster of the first type or from fissile material having a degree of enrichment different from that contained in the elements of fuel assemblies 24.

The rods of the sub-clusters 48 are guided, below partition 44, by tubes 53 similar to tubes 46.

Each mechanism for moving a sub-cluster comprises a cylinder 54. The cylinder has a head fixed to plate 18 and a tubular body extending up to the partition 44 to which it is fixed. The partition 44 comprises openings for communicating the inside of the tubular body with the plenum.

A stepped piston 56 is slidably received in cylinder 54. It has sealing rings 58 and defines a work chamber 60. The pommel 50 is suspended by a universal joint 62 from piston 56. The work chamber 60 is connected to the outside of the pressure vessel 10 by a duct having two sections 64 and 66. Section 64 is secured to plate 18 and projects upwardly therefrom. Section 66 sealingly passes through lid 12. Sections 64 and 66 comprise the co-operating elements of a sliding connection 68 for providing some degree of fluid tightness. In practice, it is sufficient to provide stepped grooves for sufficient sealing. Each duct section 66 is connected to a valve 70 for cutting off the section or connecting it to an enclosure 72 at a pressure lower than the pressure which prevails in the reactor vessel.

Figure 3:
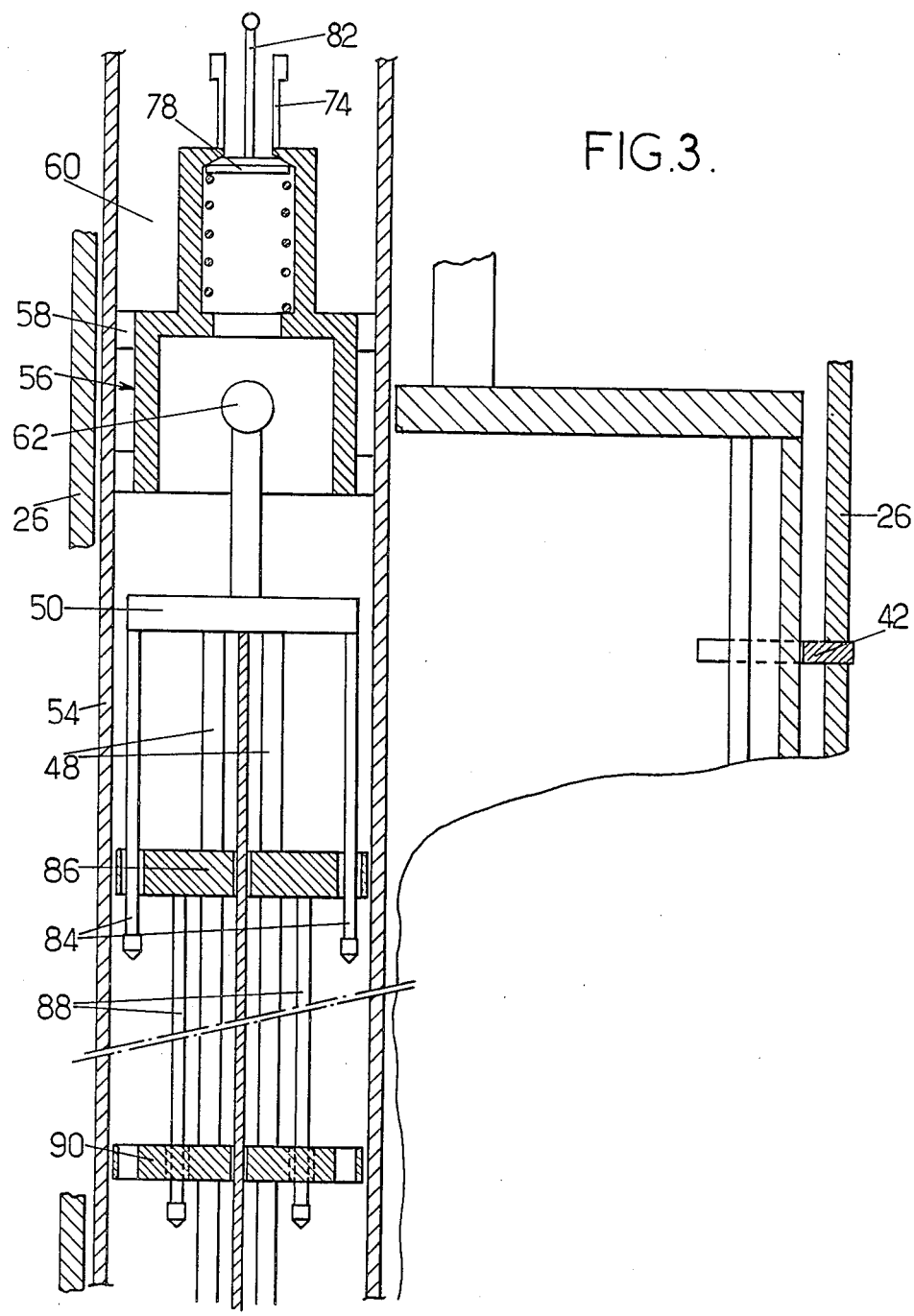
FIG. 3 is an enlarged sectional view through line III—III of FIG. 2.

The cylinder head and the piston 56 comprise co-operating means for locking the sub-cluster in its top position. As shown in FIGS. 1 and 3, such means comprise a plurality of resilient fingers 74 each having a locking latch for catching a socket 76 carried by the cylinder. That socket may be rotatable between two positions on the cylinder, according to a well known construction. Engagement of the smaller diameter end part of the piston into a bore of the head of the cylinder, at the end of travel of the piston, ensures mutual centering so that locking takes place under satisfactory conditions.

A set of two valves 78 and 80, one of which is carried by the piston and the other by the cylinder head, achieves communication between the lower part of the cylinder, the work chamber 60 and the zone above plate 18 when the sub-cluster is in its top position. The two valve closure members are both spring biased into their closure positions. The valve closure member 78 has a push rod 82 which, at the tope end of travel of the piston, abuts the closure member of valve 80 and forcibly opens the two valves.

The rods of the sub-clusters 48 are provided with guide means which comprise, in addition to the tubes 53 which provide continuous guiding in the lower part of sleeve 28, discontinuous guide means. Such guide means may have different constructions. They will typically be telescopic so as not to limit the downward travel of piston 56 in the cylinder. The guide means shown by way of example in FIG. 3 comprise a first set of rods 84 fixed to the cross-shaped pommel 50 and slidably received in a transversal plate 86. The plate is slidably mounted in cylinder 54. It comprises passages in which the elements of the sub-clusters 48 may slide: the plate 86 has connecting means for connection of a second set of guide rods 88 slidably received in a transversal plate 90.

The two sets of rods (rods 84 fixed to pommel 50 and rods 88 fixed to the plate 90) are both located at the same vertical level when the pommel 50 of the cluster, driven downwards, has moved the two cards 90 and 86 into contact and above the partition 44 of the structure for continuous guiding. The two sets of rods 84 and 88 are then housed in certain of the tubes which achieve continuous guiding and which are provided for this purpose. The permeability of cards 86 and 90 with respect to the slow rising water flow is such that only lower arresting end pieces of the rods (FIG. 3) ensure the rise thereof.

Since operation appears from the foregoing description, it is sufficient to describe lifting and lowering of the sub-clusters briefly. When a sub-cluster is in its lower position, it is sufficient to connect the corresponding work chamber 60 to enclosure 72 for lifting the sub-cluster. The pressure difference across piston 56 causes the sub-cluster to rise. The openings in partition 44 may be sized to limit the rising speed. When the piston arrives close to its locking position, valves 78 and 80 open and reduce the pressure differential. Once locking is achieved, valve 70 may be closed.

Several solutions are possible for releasing a sub-cluster and lowering it. Valve 70 may comprise a third channel for connecting the duct section 66 to an enclosure where the pressure is higher than in the vessel 10, so as to develop a force which overcomes the resilient locking force of fingers 74: the sub-cluster then travels downwards under its own weight.

I claim:

1. A nuclear reactor comprising: a pressure vessel having a closure lid; a core formed of vertical fuel assemblies placed side by side in said vessel; a plurality of control clusters each provided with a separate mechanism for moving it vertically between a lower position in which it is inserted in the core and a higher position in which it is outside the core; and an upper internal structure fixed to the vessel, placed above the core and comprising means for guiding the clusters, wherein some of said mechanisms which are associated with some of said clusters each comprise a vertical cylinder included entirely within said upper internal structure of the reactor, and fixed to said upper internal structure only a piston slidably received in said cylinder and connected to said cluster, a work chamber defined by said cylinder and piston and connected, by duct means passing through the lid, to a control valve operable for connection of the work chamber with a space at a pressure lower than that which prevails in the vessel, wherein the cylinder and piston of a same one of said mechanisms comprise co-operating means for mechanically locking the piston in a higher position thereof, and wherein the piston and the cylinder comprise valves having resilient closure means, placed so as to open each other upon movement of the cluster into the higher position thereof and so as to place the work chamber in communication with the inside of the vessel.

2. A nuclear reactor according to claim 1, wherein said duct means comprise a section fixed to the cylinder and a section passing through the lid, said sections being connected by a sliding coupling.

3. A nuclear reactor according to claim 1, wherein the upper internal structure comprises a caisson carried by the vessel, comprising an upper plate and a lower plate connected together by spacer sleeves, each sleeve forming the top fraction of a cluster guide whose low fraction is placed between the caisson and the upper core plate.

4. A nuclear reactor according to claim 1, wherein each cluster is provided with guide means comprising rods fixed to the piston and sliding in guide plates centered in the cylinder.

5. A nuclear reactor comprising:
a pressure vessel having a closure lid;
a core formed of vertical fuel assemblies placed side by side in said vessel;
a plurality of neutron energy spectrum variation rod clusters each associated with a separate one of said fuel assemblies, each of said neutron energy spectrum variation clusters consisting of a plurality of groups of rods and said groups being evenly distributed about a vertical axis of the respective fuel assembly;
a plurality of neutron absorption control clusters each having neutron absorbing rods and each associated with a separate one of said fuel assemblies;
an upper internal structure fixed to the vessel, placed above the core and comprising means for guiding said clusters upon vertical movement of said clusters;
a plurality of electromechanical drive mechanisms each for moving one of said control clusters vertically between a lower position in which it is inserted in the core and a higher position in which it is outside the core; and
a plurality of mechanisms each for moving one of said neutron energy spectrum variation rod clusters vertically between a lower position in which it is inserted in the core and a higher position in which it is outside the core, each of said mechanisms having:
a plurality of vertical cylinders located entirely within the upper internal structure of the reactor, and fixed to said upper internal structure only a piston slidably received in each of said cylinders and connected to a respective one of said groups, and a work chamber defined in each said vertical cylinder by the respective piston and connected by duct means projecting through the lid to a control valve located outside the lid and operable for connection of the work chamber with a space at a pressure lower than that which prevails in the vessel.

6. A nuclear reactor according to claim 5, wherein each cylinder associated with a group of a same one of said clusters is connected to a separate one of said control valves.

7. A nuclear reactor according to claim 1, wherein the electromechanical drive mechanism for driving the neutron absorption cluster associated with the fuel assembly is located radially inwardly of the cylinders of the groups along the axis of the fuel assembly.

* * * * *